United States Patent Office 3,459,696
Patented Aug. 5, 1969

3,459,696
WATER-REPELLENT COMPOSITIONS
Robert Emms Read, Newark, Del., assignor to E. I. du Pont de Nemours and Company, Wilmington, Del., a corporation of Delaware
No Drawing. Continuation-in-part of application Ser. No. 466,844, June 24, 1965. This application Aug. 1, 1968, Ser. No. 753,042
Int. Cl. C08f 29/22; C08g 37/32
U.S. Cl. 260—28.5          3 Claims

ABSTRACT OF THE DISCLOSURE

A composition for imparting oil and water repellency to textiles which can be applied to the textile from an aerosol container and which needs no heat cure for optimum results. The composition comprises a mixture of (A) a fluorinated copolymer of $$R_fCH_2CH_2O_2CC(CH_3)=CH_2$$

and $CH_2=C(R)CO_2R'OH$, $CH_2=C(R)CONHCH_2OH$ or $CH_2=C(R)COOR''$, and optionally a vinylidene monomer free of nonvinylic fluorine; (B) an ethylene/propylene/-1,4-hexadiene extender terpolymer; (C) a melamine-formaldehyde condensation polymer, (D) a wax; and a selected organic solvent.

CROSS-REFERENCES TO RELATED APPLICATION

This application is a continuation-in-part of copending application Ser. No. 466,844, filed June 24, 1965 now abandoned.

BACKGROUND OF THE INVENTION

Field of the invention

This invention is directed to an oil- and water-repellent coating composition for use on textiles in non-aqueous systems. This novel composition is applied, for example, as an aerosol.

Description of the prior art

There exists a need for an oil- and water-repellent coating composition for textiles and other substrates which can be applied as an aerosol for use where heat treatment to cure the coating composition on the textile is not possible or practical. No presently available coatings are known which give completely satisfactory oil and water repellencies, both initially and after laundering or dry cleaning, without heat curing.

It is, therefore, an object of this invention to provide a novel textile coating composition which renders textiles oil and water repellent, which composition may be applied from nonaqueous systems such as an aerosol and which may be applied without thermal curing.

These and other objects of the invention will be apparent from the following description and claims.

SUMMARY OF THE INVENTION

The compositions of this invention comprise: (I) from 0.1 to 50% by weight of the total composition of solids, said solids consisting of:
(A) From 48% to 87% by weight of total solids of a fluorinated copolymer consisting of:
(1) From about 25% to 99% of monomers of structure $R_fCH_2CH_2O_2CC(CH_3)=CH_2$, $R_f$ being a perfluoroalkyl group of four to 14 carbons;
(2) From 0.1 to about 20% by weight of at least one monomer chosen from $CH_2=C(R)CO_2R'OH$, $$CH_2=C(R)CONHCH_2OH$$

and $CH_2=C(R)CO_2R''$, R being hydrogen or methyl, R' an alkylene group of at least two carbons and R'' an epoxyalkyl of at least three carbons; and
(3) Sufficient to make 100% of said copolymer of at least one vinylidene monomer free of nonvinylic fluorine different from said monomers of (2);
(B) From 4% to 17% by weight of said total solids of at least one nonreactive, nonfluorinated ethylene/ propylene/1,4-hexadiene extender terpolymer;
(C) From 6% to 23% by weight of said total solids of a melamine-formaldehyde condensation product; and
(D) From 3% to 13% by weight of said total solids of a wax; and
(II) From 50% to 99.9% by weight of the total composition of an organic solvent chosen from a mixture of at least two of $CF_2Cl_2$ $CHCl=CCl_2$, $CH_3CCl_3$, $CFCl_2CFCl_2$, and $CF_2ClCFCl_2$, provided that $CF_2Cl_2$ is always one of the solvent ingredients; said solids of (A), (B), (C) and (D) above each being soluble in said solvent to the extent of from 0.03% to 20% by weight, based on weight of solvent.

This invention also encompasses a process for rendering substrates oil and water repellent which comprises spraying said substrate with the composition heretofore specifically defined and allowing the solvent to evaporate.

DESCRIPTION OF THE INVENTION

The compositions of this invention are primarily intended for aerosol application to textiles and other substrates where heat curing is not permissible or possible. For use, the solution is placed in an aerosol container and then sprayed onto the surface. Evaporation of the solvent completes the process. Usually a relatively low-boiling liquid is used as the propellent to force the contents from the container although a gas, e.g. nitrogen, nitrous oxide, tetrafluoromethane or carbon dioxide, can be used.

The compositions of this invention consist essentially of a solution of solids in a solvent or solvent mixture. In general, mixtures of the solvents recited previously are preferred, one or more to dissolve the solids and others to act as the propellent. The useful propellents are the low-boiling chlorofluorohydrocarbons recited above, due to their lack of flammability. The melamine-formaldehyde condensates are employed to aid durability to water repellency but are not required to obtain water repellency, the fluoropolymer itself being water repellent.

The fluorinated polymer itself consists of two essential components and one optional component. It contains (a) from 25% to 99% by weight, based on weight of fluorinated polymer, of monomers of structure $$R_fCH_2CH_2O_2-CC(CH_3)=CH_2$$

wherein $R_f$ is a perfluoroalkyl group of 4 to 14 carbons, (b) from 0.1% to 20% by weight of at least one of $CH_2=CRCO_2R'OH$, $CH_2=CRCONHCH_2OH$ and $$CH_2=CRCO_2R''$$

and (c) sufficient to make 100% of one or more vinylidene monomers free of nonvinylic fluorine and different from the three types of (b) above. When the sum of monomers under (a) and (b) total 100%, (c) may be absent. In other words, component (c) may be omitted if desired. It is apparent that if the fluorinated monomer of (a) and other monomers of (b) are at the minimum, the vinylidene monomer of (c) may constitute approximately 75% of the fluorinated polymer.

The fluorinated monomers $$CH_2=C(CH_3)CO_2CH_2CH_2R_f$$

contain $R_f$ perfluoroalkyl groups of 4 to 14 carbons which may be straight or branched chains. The preferred perfluoroalkyl groups have the structure $F(CF_2)_n-$ wherein $n$ is from 4 to 14 and preferably from 6 to 10. Branched perfluoroalkyl groups such as $(CF_3)_2CF(CF_2)_m-$, $m$ being from 1 to 11, or

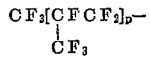

$p$ being from to to 3, may also be used. These monomers may be prepared by the processes described in French Patent 1,356,923 or Japanese, 25/18,112 from

The alcohols are prepared from $R_fCH_2CH_2I$, preferably by the process of French Patent 1,380,579; and the iodides $R_fCH_2CH_2I$ by the well known thermal or photochemical addition of $R_fI$ to ethylene.

The second essential monomer of the fluorinated polymer is chosen from the hydroxy alkyl or epoxy alkyl esters or hydroxy methylamides of acrylic or methacrylic acid.

The hydroxy alkyl esters have the structure $$CH_2=CRCO_2R'OH$$

where R is hydrogen or methyl and R' is an alkylene group of at least two carbons. In other words, these are the acrylic or methacrylic monoesters of alkylene glycols such as ethylene glycol, propylene glycol, butylene glycol or the like. The monoesters of ethylene and propylene glycols, and particularly the latter, are preferred. R' preferably contains 2–6 carbon atoms.

The epoxy alkyl esters have the structure

wherein R is hydrogen or methyl and R" is an epoxy alkyl group of 2–6 carbon atoms, i.e., esters of epoxy allyl alcohol (glycidyl alcohol), epoxy crotyl alcohol and homologs thereof. The esters of glycidyl alcohol and especially glycidyl methacrylate, are preferred.

The hydroxy methyl amides have the structure $CH_2=CRCONHCH_2OH$ where R is again hydrogen or methyl, N-methylolacrylamide is preferred.

The optional vinylidene monomers are any monomer containing the group

which will copolymerize with the other two types of monomers and which is free of nonvinylic fluorine. These monomers include the subclass of vinyl monomers containing the group $CH_2=CH-$, the simplest representative of which is ethylene itself.

Representative types of such vinylidene monomers are alkyl esters of acrylic or methacrylic acid, alkyl containing from one to as many as 18 carbons, vinyl or vinylidene halides, vinyl aromatics, vinyl and allyl esters of saturated aliphatic acids, vinyl alkyl ketones, butadiene and substituted butadienes. Representative examples are: methyl acrylate and methacrylate, propyl acrylate and methacrylate, butyl acrylate and methacrylate, isoamyl acrylate and methacrylate, 2-ethylhexyl acrylate and methacrylate, octyl acrylate and methacrylate, octadecyl acrylate and methacrylate, lauryl acrylate and methacrylate, cetyl acrylate and methacrylate, vinyl acetate, vinyl propionate, vinyl caprylate, vinyl laurate and vinyl stearate, styrene, α-methylstyrene, p-methylstyrene, vinyl fluoride, vinyl chloride, vinyl bromide, vinylidene fluoride, vinylidene chloride, allyl heptanoate, allyl acetate, allyl caprylate, allyl caproate, vinyl methyl ketone, vinyl ethyl ketone, 1,3-butadiene, 2-chloro-1,3-butadiene, 2,3-dichloro-1,3-butadiene and isoprene.

The preferred vinylidene monomers are the alkyl methacrylates, n-butyl, n-amyl, n-hexyl, isoamyl, 2-ethylhexyl, n-heptyl and n-octyl methacrylates. Styrene, 2,3-dichloro-1,3-butadiene and alkyl acrylates are also quite useful in the present invention, but generally less preferable than the methacrylates.

The solids of the present composition also contain from 4% to 17% by weight of a nonreactive, nonfluorinated ethylene/propylene/1,4-hexadiene terpolymer. The term "nonfluorinated" indicates that these polymers are free of fluorine completely. "Nonreactive" indicates that these polymers are free of groups which will react with either the fluorinated polymer or melamine derivatives as defined and described, or with the textile substrate. This means that these extender polymers must be free of acidic groups, i.e., $CO_2H$ or $SO_3H$, acid halide group, i.e., $-COCl$ or $-SO_2Cl$, hydroxymethylamide groups $-CONHCH_2OH$, epoxy groups, aminoalkyl or aminoalkyl ester groups $-CO_2(CH_2)_nNR_2$.

The terpolymer is prepared in accordance with the general directions set forth in U.S. Patent 2,933,480 using a diisobutyl aluminum chloride/vanadium oxytrichloride catalyst and a tetrachloroethylene solvent employing the three monomers in weight percents according to the unit weight percents desired. The terpolymer preferably contains 40–45% propylene monomer units by weight and 3.5–4.5% 1,4-hexadiene units by weight, with the remainder being ethylene. Preferably also, the terpolymer will have a specific gravity of about 0.85 and a Mooney (ML 1+4/250° F.) viscosity of about 40. A terpolymer similar in composition but having a Mooney viscosity of about 70 can be prepared and employed also. The terpolymer is soluble in benzene, hexane, cyclohexane, tetrachloroethylene and carbon tetrachloride.

The solids of the present composition contain from 6% to 23% by weight of a melamine-formaldehyde condensate. These condensation products contain up to six hydroxy methyl or alkoxy methyl groups attached to the melamine amino nitrogens. They may further contain reaction products of the above with high-molecular-weight acids and products derived from such acid derivatives by reaction with alkanol amines or the like. These condensation products are well known in the art and are described in the following U.S. Patents: 2,398,569; 2,454,495; 2,529,856; 2,783,231; 2,835,639 and 2,864,781.

The solids of the present composition may also contain 3% to 13% wax. The wax is usually a paraffin wax although other types may be used if desired. Wax increases the water repellency although the fluorinated polymers are themselves water repellent.

The fluorinated polymers of (A), the melamine-formaldehyde condensates of (C), the nonreactive extender polymers of (B) and the wax of (D) must each be soluble in the chosen solvent to the extent of at least 0.03% by weight to form useful compositions. The compositions of the solids herein described are such that maximum solubilities of about 20% by weight are all that is required. Higher solubilities also detrimentally affect dry cleaning durability.

In general, the fluorinated polymers employed in this invention may be prepared by any of the known techniques for emulsion polymerization of vinyl compounds. The process will be carried out in a reaction vessel fitted with a stirrer and external means of either heating or cooling the charge. The monomer or monomers to be polymerized together is emulsified in a water solution of a surface active agent to a given emulsion concentration of from about 5% to about 50%. Usually the temperature is raised to between 40° C. and 70° C. to effect polymerization in the presence of an added catalyst. A suitable catalyst may be any one of the commonly known agents for initiating the polymerization of an ethylenically unsaturated compound. These include 2,2′-azodiisobutyramidine dihydrochloride, 2,2′-azodiisobutyronitrile, 2,2′ - azobis(2,4 - dimethyl - 4 - methoxyvaleronitrile), sodium peroxide, barium peroxide, hydrogen peroxide, ammonium persulfate, potassium persulfate, and the like. The concentration of the catalyst for the polymerization usually is between 0.1% and 2% based on the weight of the monomers. The surface active agents employed to stabilize the emulsion during its makeup and polymerization are anionic, cationic, or nonionic emulsifying agents, but preferably they are the cationic or nonionic type. Representative anionic emulsifying agents are alkyl ($C_{10}$ to $C_{18}$)-sodium sulfate, sodium alkyl ($C_{12}$ to $C_{18}$)-benzenesulfonate, sodium alkylnaphthalenesulfonate, the sodium salt of sulfated alkenyl ($C_{16}$ to $C_{18}$) acetate, sodium oleate, the sodium salt of sulfated methyl oleate, ammonium -H-polyfluoroalkyanoate ($C_8$ to $C_{10}$), and ammonium perfluoroalkanoate. The cationic agents that may be employed include dodecyltrimethylammonium acetate, trimethyltetradecylammonium chloride, hexadecyltrimethylammonium bromide, trimethyloctadecylammonium chloride, (dodecylmethylbenzyl)trimethylammonium chloride, benzyldodecyldimethylammonium chloride, N-[2-(diethylamino)ethyl]-oleamide hydrochloride. Nonionic surface active agents that may be employed include condensation products of ethylene oxide with hexylphenol, isooctylphenyl, hexadecanol, oleic acid, alkane ($C_{12}$–$C_{16}$)thiol, alkyl ($C_{12}$–$C_{18}$) amines and the like.

The polymer resulting from the emulsion polymerization is isolated by coagulation filtration or the like and dissolved in the organic solvent or in some cases may be extracted directly from the emulsion into the organic solvent.

The fluorinated polymers may be prepared also by solution polymerization techniques which are well known in the art. The chosen monomers and the initiators are dissolved in the solvent in a reaction vessel fitted with a stirrer and means of either heating or cooling the charge. Concentrations of the monomer and solution may vary from 5–50%. The reaction temperature is raised to between 40–100° C. to effect polymerization. When polymerization is complete, the resulting solution is usually used directly to prepare the compositions of this invention by merely dissolving therein the other components. Useful initiators for solution polymerization are peroxide and azo compounds which are soluble in the organic solvent. These include an acyl peroxide such as benzoyl peroxide and lauroyl peroxide, organic peresters such as tertiary butyl perbenzoate, dialkyl peroxides such as dietertiarybutyl peroxide and organic azo compounds such as azobis(isobutyronitrile) and azobis(2,4-dimethylvaleronitrile) and known related compounds. The concentration of initiators will usually range from about 0.1% to about 2% based on the weight of monomers. If the solvent itself or other conditions are insufficient to properly control molecular weight, small amounts of chain transfer agents such as alkanethiols with 4–12 carbons may be added. The preferred solvents for the solution polymerization of the fluorinated monomers are trichlorotrifluoroethane and tetrachlorodifluoroethane.

The compositions of the present invention are quite simply prepared by dissolving the fluorinated polymer, the terpolymer, and the melamine derivative and wax, in the desired solvents to obtain solutions of the desired concentration. Ordinary methods for preparing solutions are used. The solutions are then placed in an aerosol container fitted with a suitable valve. A large number of suitable containers and valves are available; a suitable choice of container and valve for any particular solution being well within the skill of those versed in the art.

As noted earlier, this invention uses at least two solvents, a relatively low boiling solvent which acts as the aerosol propellant and a relatively higher-boiling solvent to dissolve the solids. In preparing the compositions, the fluorinated polymer, terpolymer, and the melamine derivative and wax are dissolved in one or more of the hereinbefore-mentioned solvents. If it is necessary to ship the composition before preparing the aerosol formulations, the solution in the higher-boiling solvents is transported since pressurized containers are not required. The aerosol dispensing packages are prepared by adding the requisite amount of solution in higher-boiling solvent to the areosol container. Then the suitable amount of propellant is added. Two methods are available; namely, cooling the container and adding the propellant as a liquid before affixing the valve or by first affixing the valve then pressure loading the propellant. The latter is preferred since cooling could cause constituents of the solution to separate. The amount of propellant required relative to the remainder of the composition depends on the properties of the solution, the propellent itself and the container and valve being used. Excess propellent does no harm so long as the concentration of solids in the propellent solvent combination exceeds 0.1% by weight. Lower concentrations are inefficient for treating surfaces.

The composition is sprayed on the surface until the latter is covered, usually determined by a "wet" appearance of the surface. The solvents are then allowed to evaporate; no further treatment is required. Usually such treatment will provide a dry-pick up of at least 0.1% by weight. The concentration of solids in solution is adjusted so that application by the above method gives this level of pickup. When facilities are available, pickup can be measured and adjusted as necessary to obtain the desired results.

Suitable substrates for the application of the compositions of this invention are films, fibers, yarns, fabrics, and articles made from filaments, fibers or yarns derived from natural, modified natural, or synthetic polymeric materials or from blends of these other fibrous materials and other porous materials which absorb and transport low surface tension liquids either on their surfaces or in their interstices by capillary action. Specific representative examples are cotton, silk, regenerated cellulose, nylon, fiber-forming linear polyesters, fiber-forming polyacrylonitrile, cellulose nitrate, cellulose acetate, ethyl cellulose, leather, paper, fiber glass, wood surfaces, material or components, metal surfaces, unglazed porcelain, porous concrete and the like, to provide products having a high repellency to oil and water. The compositions of this invention are particularly useful for applying to upholstery fabrics, leather and the like where aqueous media is undesirable, and where heat curing is not possible such as in fabricated articles such as furniture, rugs, clothing, shoes and the like in the home.

The materials rendered oil and water repellent by the compositions of this invention retain a major portion of the original water repellency after laundering or dry cleaning, unlike presently available oil and water repellents from aerosols.

The following examples are representative and illustrate the present invention and the utility thereof. The scope of this invention is not intended to be limited by these examples.

Example 1

This example illustration the general method for solution polymerization in preparation of fluorinated polymers utilized in the practice of this invention.

A mixture of 192.0 parts perfluoroalkyl methacrylate of structure $F(CF_2)_nCH_2CH_2OC(CH_3)=CH_2$ wherein $n=6$, 8 and 10 in the weight ratio 3:2:1 and containing trace amounts of $n=12$ and 14, 48.0 parts n-butylmethacrylate and 12.0 parts glycidyl methacrylate was dissolved in a mixture of 75 parts of 1,1,2-trichlorotrifluoroethane and 240 parts 1,2-difluorotetrachloroethane. The solution was purged for one hour with nitrogen then heated to reflux under a blanket of nitrogen. A total of 0.60 part α,α'-azobis(isobutyronitrile) was added with agitation at 74° C. to the solution in two equal portions with an interval of three hours between additions. The reaction mixtures was heated a total of 12 hours at 74° C. The solvent was then removed from the reaction mixture by evaporation under reduced pressure and the resulting solid polymer isolated. The polymer had an inherent viscosity of 0.54 at 30° C. as a ½% solution in 1,1,2-trichlorotrifluoroethane.

*Analysis.*— C, 40.2; H, 3.6; F, 45.0. Calculated for a polymer of the same composition as the ratio of monomer charged, i.e., 76.2% perfluoroalkyl methacrylate, 19% butylmethacrylate and 4.8% glycidyl methacrylate: C, 39.3; H, 3.5; F, 45.6.

Inherent viscosity determined according to the formula:

$$n_i = \frac{1}{C} \ln\left[\frac{n}{n_o}\right]$$

wherein $n_i$ is the inherent viscosity, $n$ is the measured viscosity of the 0.5% solution, $n_o$ is the measured viscosity of the pure solvent and C is the concentration of polymer in g./100 ml. of solution and ln is the natural logarithm.

Examples 2–8

These examples describe the preparation of fluorinated copolymers employed in the invention.

Using the procedure of Example 1, the polymerizations shown in Table I (which follows) were carried out. In each case the monomer or monomers were dissolved in the indicated solvents. The indicated initator was added and the reaction mixture was heated for the indicated length of time. The polymers were isolated as in Example 1.

TABLE I

| | | Conditions | | | | | | Product Properties | | | |
|---|---|---|---|---|---|---|---|---|---|---|---|
| Ex. No. | Fluoro-monomer,[a] Parts | Comonomer, Parts | | Initiator,[c] Parts | Solvent,[d] Parts | Temp., °C. | Time, Hrs. | Inherent Viscosity, 30° C. | Percent | | Solubility At Least 1–3% weight |
| | | A[b] | B[b] | | | | | 0.5% in $CF_2ClCFCl_2$ | C | H | F | |
| 2 | 192 | BMA, 48 | GMA, 12 | IBN, 0.6 | {BF, 240; TF, 75} | 74 | 12 | 0.37 | 40.4 | 3.7 | 45.0 | $CF_2ClCFCl_2$, $CFCl_2CFCl_2$, $CHCl=CCl_2$. |
| 3 | 192 | BMA, 48 | GMA, 12 | IBN, 0.6 | {BF, 240; TF, 75} | 74 | 12 | 0.43 | 40.5 | 3.9 | 45.0 | $CF_2ClCFCl_2$, $CFCl_2CFCl_2$, $CHCl=CCl_2$. |
| 4 | 53 | BMA, 5 | MAM, 1 | IBN, 0.2 | TF, 300 | 47 | 20 | | | | | $CFCl_2CFCl_2$, $CF_2ClCFCl_2$, $CHCl=CCl_2$. |
| 5 | 53.1 | BMA, 5.0 | HPMA, 1.3 | IBN, 0.2 | TF, 300 | 47 | 18 | | | | | $CF_2ClCFCl_2$, $CHCl=CCl_2$. |
| 6 | 64 | BMA, 16 | GMA, 1.0 | IBN, 0.2 | {BF, 80; TF, 25} | 75 | 12 | 0.33 | 39.4 | 3.5 | 46.6 | $CF_2ClCFCl_2$, $CFCl_2CFCl_2$, $CHCl=CCl_2$. |
| 7 | 128 | BMA, 32 | GMA, 3.8 | IBN, 0.2 | {BF, 160; TF, 50} | 74 | 8 | 0.42 | 39.6 | 3.6 | 46.8 | $CF_2ClCFCl_2$, $CFCl_2CFCl_2$, $CHCl=CCl_2$. |
| 8 | 128 | EHMA, 32 | GA, 3.8 | IBN, 0.2 | {BF, 160; TF, 50} | 74 | 15 | | 39.0 | 3.4 | 48.1 | $CF_2ClCFCl_2$, $CFCl_2CFCl_2$, $CHCl=CCl_2$. |

[a] Fluoromonomer in all cases. $CH_2=C(CH_3)CO_2CH_2CH_2R_f$, $R_f=n$-$C_6F_{13}$, n-$C_8F_{17}$ and n-$C_{10}F_{21}$ in weight ratio 3:2:1, containing less than 10% $nC_{12}F_{25}$ and $nC_{14}F_{29}$.
[b] BMA=Butyl methacrylate, MAM=N-methylol acrylamide, EHMA=2-Ethylhexyl methacrylate, GMA=Glycidyl methacrylate, GA=Glycidly acrylate, HPMA=2-Hydroxypropyl methacrylate.
[c] IBN=azobis(isobutyronitrile).
[d] BF=$CFCl_2ClCFCl_2$, TF=$CF_2ClCFCl_2$.

Example 9

This example describes a preparation of a fluorinated copolymer employed in the compositions of this invention.

A mixture of 44.2 parts of diamethyloctadecylamine and 27.1 parts glacial acetic acid was prepared, combined with 2137 parts water and agitated until mixing was complete. Then 1472 parts of $$F(CF_2)_nCH_2CH_2O_2CC(CH_3)=CH_2$$

wherein $n$ is 6, 8 and 10 in the approximate weight ratio of 3:2:1 containing also approximately 10% by weight of $n=12$–14, were added to the aqueous mixture with agitation and recycled through a centrifugal pump for approximately 30 minutes. The mixture was then pumped through a Manton-Gaulin homogenizer under a pressure of approximately 7,000 pounds. This mixture was then purged with nitrogen for about one hour. In a separate vessel, 1650 parts water were heated under reflux to remove air and then the homogenized mixture prepared above was added. A solution of 0.15 part lauryl mercaptan in 29.4 parts n-butyl acrylate was added followed by 12.3 parts of 60% aqueous solution of N-methylolacrylamide. The temperature of the resulting mixture was adjusted to 60° C. and 0.59 part of azobis (isobutyramidine dihydrochloride) was added. The resulting charge was maintained at about 60° C. with agitation until the intial exothermic reaction subsided. The temperature was increased to 70° C. and the reaction mixture was maintained at 70° C. for about four hours. The conversion of monomer was approximately 99.4% and the resulting polymer dispersion is free of any precoagulum.

Examples 10 and 11

Using the procedure of Example 9 the polymerizations show in Table II which follows were carried out. In each case the monomer or monomers were dispersed in water as in Example 9, the indicated initiator was added and the reaction mixture was heated with agitation for the indicated length of time. The polymers were isolated as before.

TABLE II

| Ex. No. | Fluoro-monomer,[a] Parts | Comonomer, Parts | | Initiator,[c] Parts | Temp. |
|---|---|---|---|---|---|
| | | A[b] | B[b] | | |
| 10 | 98 | BuA, 2 | MAM, 0.25 | IBH | 74 |
| 11 | 97.5 | BuA, 2 | MAM, 0.5 | IBH | 74 |

[a] See footnote (a), Table I.
[b] MAM=N-methylolacrylamide; BuA=butyl acrylate.
[c] IBH=Azobis(isobutyramidine dihydrochloride).

The following examples illustrate the application of the compositions of this invention to textile fabrics. In these examples the solution is uniformly sprayed over a fabric from the aerosol containers described until wet. The solvent is allowed to evaporate and the dry fabric is evaluated for oil and water repellency both before and after being subjected to standard laundering and dry cleaning procedures.

The treated fabric samples are evaluated for water repellency using A.A.T.C.C. Standard Test Method 22–1952 of the American Association of Textile Chemists and Colourists. A rating of 100 denotes no water penetration or surface adhesion, a rating of 90 denotes slight random sticking or wetting and so on.

The oil repellency test comprises placing a drop of test solution carefully on the textile on a flat horizontal surface. After three minutes, any penetration or wicking into the fabric is noted visually. The nature of the test solutions is shown below; Nujol, of course, is a purified petroleum oil. Anything with a rating of 5 or greater is good or excellent, anything with a rating of 2 or over can be used for certain purposes. As an example, if treated fabric repels the No. 2-6 solutions but not the No. 7 solution, its rating is 6.

| Oil Repellency Rating | Test Solution | Surface Tension, Dynes/cm. at 25° C. |
|---|---|---|
| 9 | n-Heptane | 20.0 |
| 8 | n-Octane | 21.8 |
| 7 | n-Decane | 23.5 |
| 6 | n-Dodecane | 25.0 |
| 5 | n-Tetradecane | 26.7 |
| 4 | 50-50 hexadecane-Nujol | 28.7 |
| 3 | 27-75 hexadecane-Nujol | 30.3 |
| 2 | Nujol | 31.2 |

After the oil and water repellency ratings were determined, a portion of each treated fabric sample was given a standard washing and water and oil repellency ratings were again determined. A standard washing consists of agitating the treated fabric for 15 minutes at 70–80° C. in water containing 0.2% by weight of a heavy duty, built detergent (Tide), rinsing with boiling water, then cold water and ironing at 235° F. A portion of each treated fabric sample was also given a standard dry cleaning and the oil and water repellency ratings were again determined. A standard dry cleaning consists of agitating the sample 20 minutes in tetrachloroethylene containing 1.5% (weight/volume) of a commercial dry cleaning detergent (R. R. Street Co., 886 Detergent), extraction with tetrachloroethylene, drying for three minutes at 66° C. in a drum followed by a 15-second pressing at 149° C. on each side of the fabric.

Example 12

A solution of 8.14 parts of the fluorinated terpolymer of Example 1 was prepared in 17.4 parts $CFCl_2CFCl_2$ and 83.2 parts of $CF_2ClCFCl_2$. A second solution was prepared by dissolving 3.84 parts of melamine-formaldehyde condensate, 2.83 parts of ethylene/propylene/1,4-hexadiene terpolymer and 2.14 parts of paraffin wax in 54.1 parts of trichloroethylene. These two solutions were mixed together with 2730 parts of trichloroethylene. Then 384 g. of the resulting solution and 216 g. of $CF_2Cl_2$ were placed in a 16 oz. aerosol can sealed with a Newman-Green B-14-70 valve with B-14-1 activator.

The melamine-formaldehyde condensate is the reaction product of one mole hexamethoxymethylmelamine with three moles commercial behenic acid following the procedure of U.S. Patent 2,398,569.

The terpolymer is a terpolymer of ethylene, propylene and 1,4-hexadiene prepared as described previously. It has a Mooney viscosity of about 40. The paraffin wax is Atlantic Wax 115.

The solution is summarized below in Table III.

TABLE III

| Material | Percent of— Solids | Total |
|---|---|---|
| Fluoropolymer, Example 1 | 48.0 | 0.180 |
| $CFCl_2CFCl_2$ | | 0.383 |
| $CF_2ClCFCl_2$ | | 1.830 |
| Melamine-formaldehyde condensate | 22.7 | 0.085 |
| Hydrocarbon terpolymer | 16.7 | 0.062 |
| Wax | 12.6 | 0.047 |
| $CCl_2=CHCl$ | | 61.193 |
| $CF_2CCl_2$ | | 36.23 |

Total active ingredients 0.37%, total fluoromonomer 0.144%. The formulation is stable for at least one week at 50° C. and for at least three weeks at ambient temperature.

Samples of various fabrics were sprayed with the above formulation until wet therewith, then allowed to dry. The fabrics were evaluated for oil and water repellency, initially and after a standard laundering and dry cleaning. The results are shown in Table IV.

TABLE IV

| | Oil and Water Repellencies | | | | | |
|---|---|---|---|---|---|---|
| | Initial | | 1 Laundering | | 1 Dry Cleaning | |
| Fabric | Oil | Water | Oil | Water | Oil | Water |
| Cotton Poplin 5BS | 6 | 80 | 2 | 50 | 4 | 70 |
| Edgar Assoc. Org | 7 | 80 | 2 | 50 | 6 | 50 |
| Rayon No.: | | | | | | |
| 113 | 7 | 80 | 4 | 50 | 5 | 50 |
| 114 | 7 | 80 | 4 | 50 | 6 | 50 |
| 115 | 7 | 80 | 4 | 50 | 6 | 70 |
| 116 | 7 | 90 | 4 | 70 | 6 | 70 |
| 117 | 7 | 80 | 3 | 50 | 5 | 70 |
| 118 | 7 | 80 | 4 | 70 | 5 | 70 |
| 119 | 7 | 80 | 5 | 50 | 6 | 80 |

The fabrics identified by numbers are all upholstery fabrics as follows:

| No. | Trade Name | Fabric |
|---|---|---|
| 113 | Vermiceli 1979 | 39% cotton, 38% spun rayon, 23% filament rayon. |
| 114 | Montaldo 4040 | 44% cotton, 32% spun rayon, 24% filament rayon. |
| 115 | Hermosa 7209 | Do. |
| 116 | Navarre 7234 | 100% spun rayon. |
| 117 | Lakewood 2148 | 45% spun rayon, 28% cotton, 27% filament rayon. |
| 118 | Beckman 9919 | 100% spun rayon. |
| 119 | Ferncroft 9918 | 70% spun rayon, 30% filament rayon. |

Methyl chloroform ($CCl_3CH_3$) when substituted for trichloroethylene in the formation of Table III, gives exactly the same results. Any of the fluorinated polymers of Examples 2–11 may be substituted for that of Example 1 with essentially equivalent results.

Example 13

A fluorinated polymer was prepared following the procedure of Example 6 using 90 parts of the same fluoromonomer mixture, 10 parts butyl methacrylate and 5 parts glycidyl methacrylate. This polymer was substituted in the formulation of Table III for the fluoropolymer of Example 1. The resulting solution was applied as in Example 12 with the results shown below on Cotton Poplin 5BS.

Repellencies

Initial:
  Oil _____ 6
  Water _____ 70
1 laundering:
  Oil _____ 0
  Water _____ 50
1 dry cleaning:
  Oil _____ 4
  Water _____ 0

Example 14

Example 1 was repeated with a small amount of dodecyl mercaptan present in the polymerization solution. The resulting polymer had an inherent viscosity of 0.13, compared to 0.54 of Example 1.

A solution was prepared by dissolving 16.28 parts of this polymer in 34.8 parts of $CFCl_2CFCl_2$ 166.4 parts of $CF_2ClCFCl_2$. A second solution was prepared by dissolving 1.03 parts melamine formaldehyde derivative, 0.78 part of the ethylene/propylene/1,4-hexadiene terpolymer and 0.58 part wax in 14.54 parts methyl chloroform. These two solutions and 2661 parts of methyl chloroform were combined. Then, 384 grams of the final solution were placed in a 16 oz. aerosol container fitted with a Newman-Green Type B-14-70 valve with B-14-1 activator and 216 grams of dichlorodifluoromethane were added under pressure. The melamine derivative, ethylene/propylene/1,4-hexadiene terpolymer and wax are the same as those used in Example 12. The composition of this formulation is shown below in Table V:

TABLE V

| Component | Percent Solids | Total |
|---|---|---|
| Fluoropolymer | 87.28 | 0.360 |
| $CFCl_2CFCl_2$ | | 0.766 |
| $CF_2ClCFCl_2$ | | 3.660 |
| Melamine Derivative | 5.53 | 0.023 |
| Ethylene/propylene/1,4-hexadiene Terpolymer | 4.08 | 0.017 |
| Wax | 3.11 | 0.013 |
| $CCl_3CH_3$ | | 59.931 |
| $CF_2Cl_2$ | | 36.230 |

Total solids: 0.41%; fluorinated monomer: 0.288%.

This formulation was applied to cotton poplin 5BS as in Example 12 with the results shown below:

Repellencies

Initial:
Oil _____ 7
Water _____ 100

1 laundering:
Oil _____ 3
Water _____ 50

1 dry cleaning:
Oil _____ 6
Water _____ 70

These are the preferred embodiments of this invention.

Example 15

This example illustrates a comparison with a commercially available material for aerosol application. Following the general procedure of Example 12, 0.5 part of a fluorinated oil and water repellent was dissolved in 70 parts methyl chloroform. The solution was combined in an aerosol container of the type used in the previous examples with 29.5 parts of $CF_2Cl_2$ and $CFCl_3$ in the weight ratio 94/6; 0.5% active ingredient.

The fluorinated oil and water repellent ("Scotchgard" 4101, Minnesota Mining Co.) has a molecular weight of 1500 and is believed to be a low molecular weight polymer of $C_8F_{17}SO_2N(R)(CH_2)_2O_2CCH=CH_2$, R being a lower alkyl group, based on elemental analysis and infrared spectrum. This material is sold for aerosol application purposes.

The aerosol was sprayed on fabrics in the same manner as Example 12. The results obtained are given below.

REPELLENCIES

| Fabric | Initial Oil | Initial Water | 1 Laundering Oil | 1 Laundering Water | 1 Dry Cleaning Oil | 1 Dry Cleaning Water |
|---|---|---|---|---|---|---|
| Cotton Poplin 5BS | 8 | 80 | 0 | 50 | 7 | 70 |
| Edgar Assoc. Org. Rayon | 7 | 70 | 0 | 0 | 0 | 0 |

Comparison of these results with Examples 12 and 14 indicates that while initial repellencies are similar, the fluorinated oil and water repellent of this example is completely removed by a single laundering, unlike those of Examples 12 and 14.

A typical terpolymer preparation is as follows: ethylene, propylene and 1,4-hexadiene are polymerized in an evaporatively cooled, continuous flow, stirred reactor operated at 30° C. The partial pressures and flow rates of the monomers are adjusted to obtain the desired composition. The terpolymers used in the examples which follow were made in hexane solution in the presence of a coordination catalyst formed in situ by combining diisobutyl aluminum monochloride with vanadium tri(acetylacetonate). The partial pressure of hydrogen in the reactor was 15.6 lb./sq. in. (absolute) and the residence time was 36.3 minutes.

The preceding representative examples may be varied within the scope of the present total specification disclosure, as understood and practiced by one skilled in the art to achieve substantially the same results.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A composition consisting essentially of (I) from 0.1 to 50% by weight of the total composition of solids, said solids consisting of
    (A) from 48% to 87% by weight of total solids of a fluorinated copolymer consisting of
        (1) from about about 25% to 99% of monomers of structure $R_fCH_2CH_2O_2CC(CH_3)=CH_2$, $R_f$ being a perfluoroalkyl group of four to 14 carbons;
        (2) from 0.1 to about 25% by weight of at least one monomer chosen from
            $CH_2=C(R)CO_2R'OH$
            $CH_2=C(R)CONHCH_2OH$
        and $CH_2=C(R)CO_2R''$, R is selected from the group consisting of hydrogen and methyl, R' is an alkylene group of at least two carbons and R'' is an epoxyalkyl of at least three carbons; and
        (3) sufficient to make 100% of said copolymer of at least one vinylidene monomer free of non-vinylic fluorine different from said monomers of (2); and
    (B) from 4% to 17% by weight of said total solids of at least one nonreactive, nonfluorinated ethylene/propylene/1,4-hexadiene extender terpolymer in which units derived from propylene comprise 40–45% of the weight of the terpolymer and units derived from 1,4-hexadiene comprise 3.5–4.5% of the total weight of the terpolymer;
    (C) from 6% to 23% by weight of said total solids of a melamine-formaldehyde condensation product; and
    (D) from 3% to 13% by weight of said total solids of a wax; and
(II) from 50% to 99.9% by weight of the total composition of an organic solvent selected from the group consisting of a mixture of at least two of $CF_2Cl_2$,
$$CHCl=CCl_2$$
$CH_3CCl_3$, $CFCl_2CFCl_2$ and $CF_2ClCFCl_2$, provided that $CF_2Cl_2$ is always one of the solvent ingredients; said solids (A), (B), (C) and (D) each being soluble in said solvent to the extent of from 0.03% to 20% by weight, based on weight of solvent.

2. The composition of claim 1 wherein:
    the monomer of part (I)(A)(1) has the formula
    $F(CF_2)_nCH_2CH_2O_2C(CH_3)=CH_2$
    in which n is 6, 8 and 10 in the weight ratio of 3.2:1 and in which traces of n of 12 and 14 are present;
    the monomer of part (I)(A)(2) is glycidyl methacrylate;
    the monomer of part (I)(A)(3) is n-butylmethacrylate;
    the polymer of part (I)(B) is a terpolymer of ethylene, propylene and a 1,4-hexadiene in which units derived from propylene comprise 40–45% of the weight of the terpolymer and units derived from 1,4-hexadiene comprise 3.5–4.5% of the total weight of the terpolymer;
    the melamine-formaldehyde condensation product of part (I)(C) is the reaction product of one mole of hexamethoxy-methylmelamine and three moles of behenic acid;
the wax of part (I)(D) is paraffin wax; and
the solvent of part II is a mixture of $CFCl_2CFCl_2$, $CF_2ClCFCl_2$, $CCl_2{=}CHCl$, $CF_2CCl_2$, and $CF_2Cl_2$.

3. A process for rendering substrates oil and water repellent which comprises spraying said substrate with the composition of claim 1 and allowing the solvent to evaporate.

No references cited.

ALLAN LIEBERMAN, Primary Examiner

H. S. KAPLAN, Assistant Examiner

U.S. Cl. X.R.

260—33, 89, 897, 900

PO-1050
(5/69)

UNITED STATES PATENT OFFICE
CERTIFICATE OF CORRECTION

Patent No. 3,459,696     Dated August 5, 1969

Inventor(s)     Robert Emms Read

It is certified that error appears in the above-identified patent and that said Letters Patent are hereby corrected as shown below:

Column 12, line 61 (claim 2) "3.2:1" should read -- 3:2:1 --.

SIGNED AND
SEALED
DEC 2 - 1969

(SEAL)
Attest:

Edward M. Fletcher, Jr.
Attesting Officer

WILLIAM E. SCHUYLER, JR
Commissioner of Patents